Jan. 14, 1947.  A. A. O'KELLY ET AL  2,414,271
CATALYTIC ALKYLATION
Filed July 21, 1944
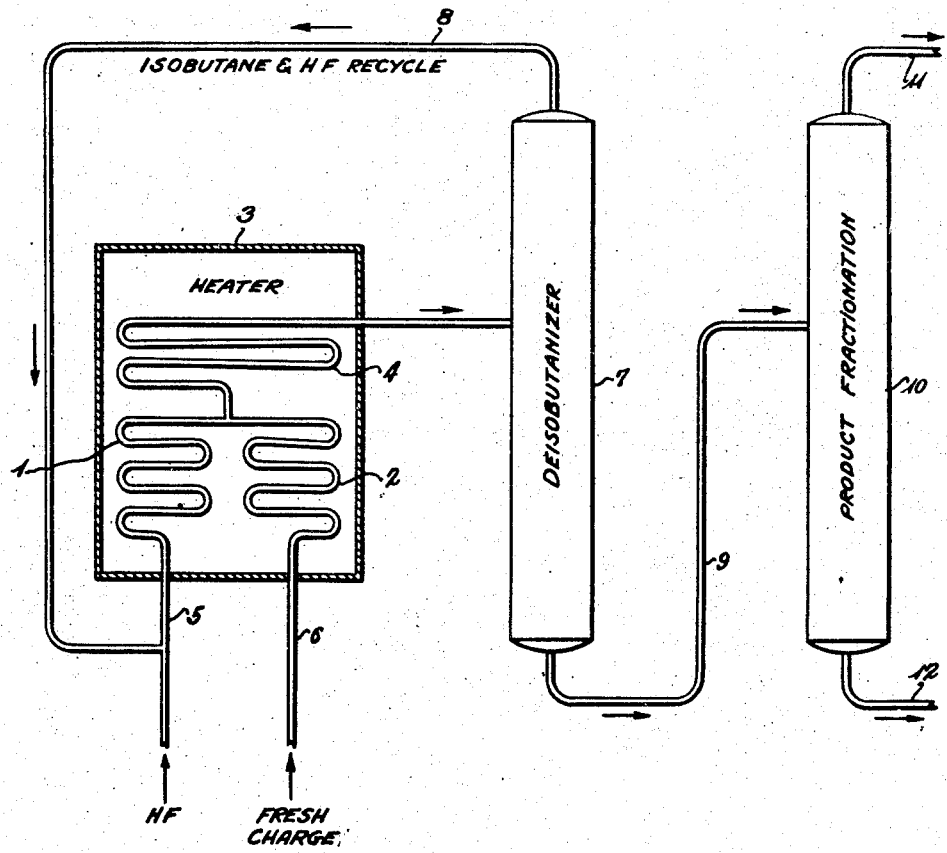
Inventors
ARLIE A. O'KELLY,
JACOB R. MEADOW AND
ROBERT E. WOODWARD Patented Jan. 14, 1947

2,414,271

UNITED STATES PATENT OFFICE 2,414,271

CATALYTIC ALKYLATION

Arlie A. O'Kelly and Jacob R. Meadow, Woodbury, and Robert E. Woodward, Westville, N. J., assignors to Socony-Vacuum Oil Company, Incorporated, a corporation of New York Application July 21, 1944, Serial No. 545,954

12 Claims. (Cl. 260—683.4)

This invention relates to a process of reacting hydrocarbons and is specifically concerned with the reaction of paraffins with ethylene in the presence of hydrogen fluoride at elevated temperature to produce branched-chain hydrocarbons valuable in motor fuel.

The reaction of paraffins, particularly isoparaffins, with olefins in the presence of hydrogen fluoride to produce alkylate of high octane value has achieved commercial acceptance. The reaction has been adapted for use by substituting hydrogen fluoride for sulfuric acid in the well known sulfuric acid alkylation process. According to this technique, a large body of reacting material comprising an emulsion of the liquid acid catalyst and hydrocarbons is maintained in a reaction zone under conditions of constant agitation. The vessel defining this reaction zone is an expensive piece of equipment commonly called a "contactor" which was designed for sulfuric acid alkylation and has been transferred without substantial change to hydrogen fluoride alkylation. A stream of emulsion is continuously circulated in the contactor passing through a circuit which includes a zone wherein fresh reactants and fresh catalyst are added to the stream.

We have now found that the type of process now in use is not well adapted to take full advantage of the unique and valuable properties of hydrogen fluoride as an alkylation catalyst.

We have now found that hydrogen fluoride alkylation may be conducted in the vapor phase to obtain products of a somewhat different nature from those prepared in low temperature liquid phase alkylation and to concurrently achieve advantage in simplicity of plant installation and operation.

It is accordingly a primary object of this invention to provide a process for reacting paraffin hydrocarbons, particularly isoparaffins with ethylene in the vapor phase and in the presence of gaseous hydrogen fluoride.

The products produced by reaction of paraffins with olefins vary with the temperature at which the reaction is conducted. For example, during the reaction of propylene with isobutane in the presence of liquid hydrogen fluoride or concentrated sulfuric acid at the temperature used commercially, i. e., in the neighborhood of room temperature, the predominant alkylation products are 2,3- and 2,4-dimethylpentane. At temperatures above about 200° F. and substantially in the vapor phase using certain alkyl halides as promoters, 2,2-dimethylpentane and 2,2,3-trimethylbutane are found in the product to an increasing extent as the reaction temperature is increased. These higher temperature alkylations therefore produce compounds of higher octane rating.

The alkylation method described herein relates to the use of dry hydrogen fluoride as an effective catalyst in vapor phase reactions involving isoparaffins and olefins. It is concerned more specifically with the alkylation of isobutane by ethylene to give appreciable quantities of di-isopropyl, a super-fuel which is known to have a better rich mixture performance than its isomer neohexane. The latter is prepared by thermal alkylation in accordance with previously known processes. We conduct the reaction of our invention at temperatures somewhat lower than those employed in thermal alkylation. In general, our process contemplates temperatures of about 700° F. to about 900° F.

The yield of neohexane by the thermal process is not very good and side reactions appear to be numerous. Although accurate data are not available it is probable that in the thermal process the yields of neohexane based on the weight of ethylene consumed may vary between 45% and 65% depending on conditions and the number of ethylene injections. No di-isopropyl is reported as present in the neohexane alkylate from the thermal process, although it is possible that traces were present or small amounts of it may have escaped detection. It is known, however, that the major component of the hexane fraction by the process mentioned above is neohexane.

We have found that the alkylation of isobutane with ethylene in the presence of substantially dry hydrogen fluoride gives both di-isopropyl and neohexane as chief constituents of the hexane fraction. By changing the conditions, such as temperature, pressure, catalyst to charge ratio, the course of the alkylation can be altered and this may directly influence the proportion of di-isopropyl to neohexane in the hexane cut. In general, a higher hydrogen fluoride catalyst to hydrocarbon charge ratio favors an increased proportion of the desirable di-isopropyl isomer in the hexane fraction of the alkylate. Increased temperatures increase ethylene conversion but decrease the percentages of di-isopropyl in the alkylates. Similarly, increased pressures increase ethylene conversion but decrease contents of di-isopropyl in the total alkylates. Increased reaction time increases conversion of ethylene.

Temperatures of 700° to 900° F., pressures of 500 to above 5000 pounds per square inch, residence times from two or three minutes up, and catalyst concentrations up to 20% all result in substantial alkylation.

Temperatures employed according to our invention may vary between about 700° and 900° F., being correlated to the other conditions of reaction used. In general, higher temperatures will increase the rate of reaction and will, for the most part, give a higher yield of depentanized alkylate. However, the proportion of octanes is increased at higher temperatures, while the percentage content of hexanes remains approximately constant. The neohexane yield increases with a decrease in di-isopropyl as the temperature is increased. Thus, the yield of di-isopropyl, expressed as percentage of the alkylate obtained, is greater at the lower temperatures. The effect of increased pressures is substantially parallel to that of increased temperature. As the pressure rises, the weight percentage of hexanes in the alkylate remains approximately constant and the percentage of octanes and higher components rises regularly. The yield of neohexane rises while that of di-isopropyl falls as the pressure is increased. Substantial alkylation is obtained below the minimum of our preferred range, i. e., 500 pounds per square inch, but the reaction is relatively slow and we therefore prefer to operate at pressures above 500 pounds at the expense of di-isopropyl yield. At constant residence time, the percentage conversion of ethylene rises regularly as the pressure is increased. Pressures above our preferred range give greater total conversion of ethylene but we prefer to operate below 5000 pounds per square inch in order to take advantage of the greater proportion of valuable hexanes (e. g. di-isopropyl) at the lower pressures of our preferred range.

Contrary to what might logically be expected, the effect of residence time varies somewhat from the effects of temperature and pressure. Total conversion of ethylene rises with increased residence time but no regular variation in the ratio of hexanes to octanes or the percentage of neohexane and di-isopropyl in the total alkylate has been found.

We have found that the ratio of hexanes to octanes undergoes no substantial change with variations in catalyst concentration. Our data indicate that the percentage of di-isopropyl rises somewhat as the percentage of hydrogen fluoride is increased in the reaction mixture.

In order to aid in an understanding of the invention as applied to continuous operation, the single figure of the drawing annexed hereto shows diagrammatically an apparatus according to a preferred embodiment of the invention. In this embodiment, reactants and catalyst are separately preheated in coils 1 and 2 in a suitable heating unit 3 which may be a furnace or a chamber filled with a heat exchange medium such as a eutectic mixture of inorganic salts. For example, hydrogen fluoride may be charged to coil 1 by inlet 5 and a mixture of paraffin and olefin charged to coil 2 by inlet 6. Alternatively, the paraffin may be conducted through a preheating coil with the catalyst. The preheated material is then united in coil 4 which is of suitable dimensions to provide the desired reaction time. If desired, the preheating coils may be dispensed with and the reactants and catalyst heated together, but separate preheating of olefin and catalyst provides better control of the process. The coil 4 may be packed with inert material to provide a large surface area for contact with the reactants and catalyst or may be replaced with an enlarged chamber similarly packed. Steel wool, copper turnings, carbon and the like, provide suitable packing material. Siliceous contact substances are to be avoided, of course, because of their vulnerability to attack by hydrogen fluoride.

The reaction mixture from coil 4 is conducted to a fractionating column 7 from which hydrogen fluoride and unreacted hydrocarbons are taken overhead by line 8 for recycling to the process. If the reactants contain any water which will tend to dilute the catalyst below the desired concentration, means may be interposed in line 8 to remove excess moisture. The bottoms from column 7 are transferred by line 9 to a second fractionator 10 in which the product is separated into a light alkylate fraction in line 11 and a heavy bottom fraction withdrawn at 12.

A series of typical alkylations of isobutane with ethylene in the presence of a hydrogen fluoride catalyst, according to our invention, is described in the specific examples set out below:

Example I

A mixture of isobutane and ethylene containing 13.6 mol per cent of ethylene was charged continuously to a reactor at the rate of 35 cc. of liquid hydrocarbons per minute while charging 10 cc. of liquid HF per 100 cc. of liquid hydrocarbons. The acid and hydrocarbons were preheated and thoroughly mixed in the reactor at a temperature of 725° F. under pressure of 4500 lbs. per square inch. A yield of 37.7% pentane-free alkylate (based on ethylene charge) was obtained. The alkylate contained 3.2% neohexane and 20.9% di-isopropyl. The period of residence in the contractor was 5.8 minutes.

In all the runs made, it was noted that the debutanized alkylate was about 10% greater than the depentanized alkylates upon which the present examples are reported.

Example II

A run similar to that of Example I was made at a temperature of 750° F. using a charge rate of 28.5 cc. per minute liquid hydrocarbons and 7.8 cc. of liquid HF per 100 cc. of liquid hydrocarbons. In this case, the yield was 47% of which 4.8% was found to be neohexane and 17.6% di-isopropyl. The residence time was 7.5 minutes.

Example III

On a run similar to that of Example I at a temperature of 800° F. and a charge rate of 33.3 cc. liquid hydrocarbon per minute, 86% of depentanized alkylate based on the weight of ethylene charged was obtained containing 11.3% neohexane and 17.4% diisopropyl. The conditions resulted in a residence time of 5.8 minutes.

Example IV

A run made at 800° F. and 500 lbs. per sq. inch pressure using a charge rate of 4.2 cc. liquid hydrocarbons per minute and 11.1 cc. HF per 100 cc. of hydrocarbon gave a yield of 24% depentanized alkylate. 42% of this alkylate was found in the fraction boiling from 54 to 64° C., indicating a high proportion of hexane. Residence time, 4.9 minutes.

Example V

An alkylation at 810° F. and 1000 lbs. per sq. inch pressure gave an alkylate yield of 53% when using a charge rate of 8.3 cc. per minute and 10.2 cc. HF per 100 cc. hydrocarbons. Of this alkylate, 7% was found to be neohexane and 22.7% was di-isopropyl. Residence time, 5.0 minutes.

*Example VI*

An alkylate yield of 63% was obtained at 808° F. and 1900 lbs. pressure when using a charge rate of 17 cc. per minute with 9.9 cc. HF per 100 cc. liquid hydrocarbons. 10-15% of this alkylate was neohexane and 14.1% was di-isopropyl. Residence time 4.8 minutes.

*Example VII*

Charging 25.2 cc. per minute with 10.2 cc. HF per 100 cc. of hydrocarbons at 805° F. and 3000 lbs. pressure gave a 75% yield containing 10-15% neohexane and 13% di-isopropyl. Residence time 5.0 minutes.

*Example VIII*

At 810° F. and 4500 lbs. pressure, a 53% yield was obtained at a charge rate of 68.2 cc. per minute and 9.7 cc. HF per 100 cc. of hydrocarbons. 12.5% of the alkylate was neohexane and 8.9% was di-isopropyl. Residence time 2.8 minutes.

*Example IX*

A run conducted at 800° F. and 4500 lbs. pressure, using a charge rate of 16.7 cc. per minute and 9.9 cc. HF per 100 cc. of hydrocarbons gave a yield of 118%. 17.3% of the alkylate was neohexane and 7.4% was di-isopropyl. Residence time 11.5 minutes.

*Example X*

At 800° F. and 4500 lbs. pressure, a charge rate of 18.4 cc. per minute and 5.6 cc. HF per 100 cc. of hydrocarbons gave a yield of 136% of which 16.7% was neohexane and 6.7% was di-isopropyl. Residence time 12.2 minutes.

*Example XI*

At the same conditions of temperature and pressure as Example X, and a charge rate of 15 cc. per minute with 20 cc. HF per 100 cc. of liquid hydrocarbons, a yield of 86% was obtained. 12-18% of the depentanized alkylate was neohexane and 14.6% was di-isopropyl. Residence time 9.6 minutes.

We claim:

1. A process for synthesis of high anti-knock motor fuel components which comprises reacting ethylene with an isoparaffin in the presence of hydrogen fluoride at a temperature of about 700° F. to about 900° F., said hydrogen fluoride and said reactants being in vapor phase.

2. A process for synthesis of high anti-knock motor fuel components which comprises reacting ethylene with an isoparaffin in the presence of a substantial amount, not more than about 20% by weight, of hydrogen fluoride at a temperature of about 700° F. to about 900° F., said hydrogen fluoride and said reactants being in vapor phase.

3. A process for synthesis of high anti-knock motor fuel components which comprises reacting ethylene with isobutane in the presence of hydrogen fluoride at a temperature of about 700° F. to about 900° F., said hydrogen fluoride and said reactants being in vapor phase.

4. A process for synthesis of high anti-knock motor fuel components which comprises reacting ethylene with isobutane in the presence of a substantial amount, not more than about 20% by weight, of hydrogen fluoride at a temperature of about 700° F. to about 900° F., said hydrogen fluoride and said reactants being in vapor phase.

5. A process for synthesis of high anti-knock motor fuel components which comprises reacting ethylene with an isoparaffin in the presence of hydrogen fluoride at a temperature of about 700° F. to about 900° F. and a pressure of about 500 to about 5000 pounds per square inch, said hydrogen fluoride and said reactants being in vapor phase.

6. A process for synthesis of high anti-knock motor fuel components which comprises reacting ethylene with an isoparaffin in the presence of a substantial amount, not more than about 20% by weight, of hydrogen fluoride at a temperature of about 700° F. to about 900° F. and a pressure of about 500 to about 5000 pounds per square inch, said hydrogen fluoride and said reactants being in vapor phase.

7. A process for synthesis of high anti-knock motor fuel components which comprises reacting ethylene with isobutane in the presence of hydrogen fluoride at a temperature of about 700° F. to about 900° F. and a pressure of about 500 to about 5000 pounds per square inch, said hydrogen fluoride and said reactants being in vapor phase.

8. A process for synthesis of high anti-knock motor fuel components which comprises reacting ethylene with isobutane in the presence of a substantial amount, not more than about 20% by weight, of hydrogen fluoride at a temperature of about 700° F. to about 900° F. and a pressure of about 500 to about 5000 pounds per square inch, said hydrogen fluoride and said reactants being in vapor phase.

9. A process for synthesis of high anti-knock motor fuel components which comprises reacting ethylene with an isoparaffin in the presence of hydrogen fluoride at a temperature of about 700° F. to about 900° F. and a pressure of about 500 to about 5000 pounds per square inch, for a contact period of about 2 to about 20 minutes, said hydrogen fluoride and said reactants being in vapor phase.

10. A process for synthesis of high anti-knock motor fuel components which comprises reacting ethylene with an isoparaffin in the presence of a substantial amount, not more than about 20% by weight, of hydrogen fluoride at a temperature of about 700° F. to about 900° F. and a pressure of about 500 to about 5000 pounds per square inch, for a contact period of about 2 to about 20 minutes, said hydrogen fluoride and said reactants being in vapor phase.

11. A process for synthesis of high anti-knock motor fuel components which comprises reacting ethylene with isobutane in the presence of hydrogen fluoride at a temperature of about 700° F. to about 900° F. and a pressure of about 500 to about 5000 pounds per square inch, for a contact period of about 2 to about 20 minutes, said hydrogen fluoride and said reactants being in vapor phase.

12. A process for synthesis of high anti-knock motor fuel components which comprises reacting ethylene with isobutane in the presence of a substantial amount, not more than about 20% by weight, of hydrogen fluoride at a temperature of about 700° F. to about 900° F. and a pressure of about 500 to about 5000 pounds per square inch, for a contact period of about 2 to about 20 minutes, said hydrogen fluoride and said reactants being in vapor phase.

ARLIE A. O'KELLY.
JACOB R. MEADOW.
ROBERT E. WOODWARD.